Figure 1:
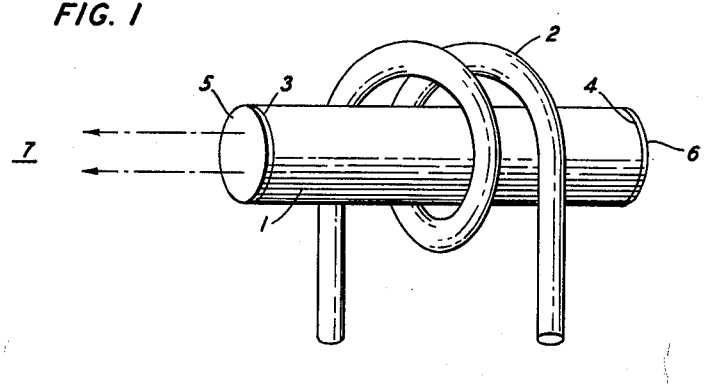

INVENTORS: R. R. SODEN
L. G. VAN UITERT
BY
ATTORNEY 3,177,155
OPTICAL MASER CRYSTALS
Ralph R. Soden, Scotch Plains, and Le Grand G. Van
Uitert, Morris Township, Morris County, N.J., assignors
to Bell Telephone Laboratories, Incorporated, New
York, N.Y., a corporation of New York
Filed Aug. 7, 1961, Ser. No. 129,793
3 Claims. (Cl. 252—301.5)

This invention relates to single crystal tungstate and molybdate materials exhibiting fluorescent properties and to devices utilizing such crystals.

Recently, considerable interest has developed in a new class of solid state maser devices in which the stimulated frequency is in the optical or near optical spectrum including the infrared and ultraviolet portions of the electromagnetic spectrum. This spectrum encompasses the wavelength range of from 100 A. to $2 \times 10^6$ A. In principle, these devices are directly analogous to the microwave maser, and the mechanics of their operation are well detailed in the literature, for example, as described by A. L. Schawlow and C. H. Townes in U.S. Patent 2,929,922, issued March 22, 1960.

Among the more promising forms of optical masers are those which employ a material whose energy level system is characterized by at least three energy levels, with the separation of these levels falling within the desired operating frequency ranges. During operation, there is established, at least intermittently, a nonequilibrium electron population distribution in a pair of the selected three energy levels. In particular, the population of the higher of the selected pairs of energy levels is increased to the point at which it is greater than that of the lower level. It is customary to refer to a material in such a state of nonequilibrium as exhibiting a negative temperature.

It is characteristic that if there is applied to a material in a negative temperature state a signal of a frequency which satisfies Planck's Law with respect to the two energy levels in nonequilibrium, the applied signal will stimulate the emission of radiation in phase with the signal frequency from the material and the signal will be amplified. In other words, the active maser material is chosen such that the two energy levels are separated by an energy equal to $h\mu$, where $h$ is Planck's constant and $\mu$ is equal to the frequency to be amplified. This separation is less than the separation between the top and bottom levels of the selected three-level energy system.

The negative temperature state is established by applying to the material pump energy of a frequency of at least the frequency corresponding to the separation between the top and bottom levels of the selected three-level energy system. The application of sufficient pump energy affects electron transitions from the bottom level to the top level and the populations of the bottom and top levels are thereby made to approach equality. Under these conditions there will be a negative temperature either between the top and middle levels or between the middle and bottom levels. Since a competing process known as "relaxation" tends to return the system to equilibrium, thereby destroying the negative temperature state, continuous pump energy is applied to the material during the period of signal amplification.

Among the more promising active maser materials are those which comprise a host crystal containing paramagnetic ions from which the stimulated emission occurs. The host crystal of a material meeting the above-described requirements must be capable of accepting the paramagnetic ions in such a way that they are able on excitation to fluoresce with good over-all quantum efficiency, with as much of the emitted energy as possible concentrated in a single line. The maximize amplification of the signal frequency, the emission line preferably corresponds to a transition to a state other than the ground state such that the single bright emission line is narrow in width.

Since the pump sources typically utilized in optical masers generally exhibit an energy output over a broad frequency spectrum, it is desirable that the paramagnetic ions possess a broad absorption spectrum to facilitate establishment of the negative temperature state. Desirably the paramagnetic ions also exhibit a relaxation time sufficiently long so that the quantum efficiency for fluorescence is close to unity. Otherwise, the magnitude of the pumping frequency would have to be greatly increased in order to maintain a negative temperature state wherein sufficient electrons are available in the higher energy level to amplify the input frequency. To ensure a narrow emission line, the energy level widths of the pair of spaced energy levels in the negative temperature state are preferably narrow.

In view of the above-detailed requirements, very few optical maser materials are known to the art. Most published work on optical masers is directed to ruby crystals and calcium fluoride crystals containing small amounts of uranium (III) and samarium (II). Ruby crystals, however, suffer the disadvantage of requiring high pumping power to establish a negative temperature state. As such, under the usual conditions ruby masers are limited in operation to producing a pulsed beam of coherent light.

As previously discussed, there should be a correspondence between the signal to be amplified and the energy level separations of the maser material. Therefore, it is desirable that new maser materials having a range of energy level separations and fulfilling the above-detailed requirements be developed so that a range of signal frequencies can be amplified.

In accordance with the present invention a new fluorescent composition of matter suitable for use in optical maser devices has been developed. The host lattices of this composition are potassium-terbium tungstate and potassium-terbium molybdate in which restricted amounts of the terbium atoms have been replaced with europium in the 3+ valence state. The composition has the empirical formula:

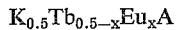

$$K_{0.5}Tb_{0.5-x}Eu_xA$$

where A is selected from the group consisting of $WO_4$ and $MoO_4$ and $x$ has a value of 0.003 to 0.5. The subscripts in the above formula signify the relative number of gram atoms of the element indicated which are present and thus are also proportional to the relative number of atoms of each element present in the composition.

The materials of the instant invention emit energy of narrow line width. For example, the line width of $K_{0.5}Tb_{0.4}Eu_{0.1}WO_4$ associated with an emitting wavelength of approximately 6150 A. is in the order of 2.5 cm.$^{-1}$ at liquid nitrogen temperature. The excited electrons evidence a relaxation time sufficiently long so that the quantum efficiency for fluorescence is close to unity.

Since the ions possess at least three energy levels and electron transitions are to other than the ground state, the establishment of a continuous negative temperature state is feasible and the material is capable of fluorescing in a continuous beam of coherent light.

Figure 2:
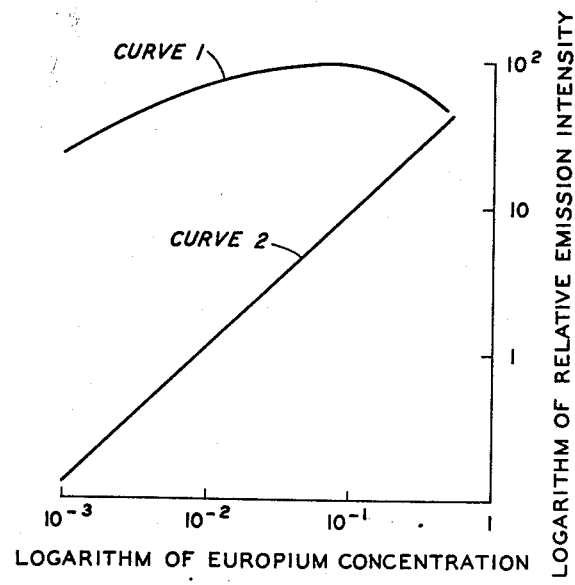

The invention may be more easily understood by reference to the drawing, in which:

FIG. 1 is a front elevational view of an apparatus utilizing the composition of the invention; and FIG. 2, on coordinates of relative emission intensity and gram atoms per formula of trivalent europium ion, is a logarithmic plot showing the dependency of the emission intensity on the concentration of europium ion in the material of the present invention.

Referring more particularly to FIG. 1, there is shown a rod shaped crystal 1 having the composition as disclosed herein. Pump energy is supplied by means of helical lamp encompassing rod 1 and connected to an energy source not shown. Lamp 2 is an ultraviolet lamp having a compact arc of high pressure mercury. Ends 3 and 4 of rod 1 are ground and polished so as to be optically flat and parallel and are silvered so as to provide reflective layers 5 and 6. As indicated, layer 6 is completely reflecting while layer 5 is only partially reflecting so permitting the escape of coherent radiation 7, having a wavelength of approximately 6150 A. Rod 1 during operation is preferably maintained in an atmosphere of liquid nitrogen (at a temperature of approximately 79° K.) so as to more readily attain a negative temperature state.

The spectrum of the pump source including ultraviolet light is desirably within the range of 2,000 A. to 4,200 A. Although higher frequencies are suitable, sources of such frequencies are not generally available. It has been found that ultraviolet light having a peak of 366° A. is most advantageous for the present purposes.

Although the expressed range is the range of energy most effective, it is not necessary to use a source having an output restricted to this range. For example, a gaseous discharge flash bulb, although emitting white light, nevertheless emits a large amount of energy in the desired spectrum.

Device discussion has been largely in terms of the most commonly reported maser design. Although such a device is easily fabricated, other configurations have been disclosed in the literature and may prove advantageous. All such variations are considered to be within the scope of the invention.

The effect of europium ion concentration on the emission intensity of the material of the invention is shown by curve 1 of FIG. 2. In this figure, the ordinate measures the logarithm of the relative emission intensity of several tungstate compositions containing added europium, with the abscissa indicating the logarithm of the europium content of these compositions. Curve 1 of this figure shows the effect of europium inclusions in one composition of the invention having the empirical formula $K_{0.5}Tb_{0.5-x}Eu_xWO_4$. It has been found that replacng $WO_4$ in the above formula with $MoO_4$ results in molybdate compositions having line widths and emission intensities comparable to the tungstate crystals of the nvention.

Based on FIG. 2, inclusions of 0.003 to 0.5 gram atoms per formula of trivalent europium in the tungstate and molybdate host crystal result in a material exhibiting an enhanced emission intensity. The lower limit of 0.003 gram atom is based on the necessity of having sufficient unpaired electrons available in the negative temperature state to adequately amplify the input signal. As seen from curve 1, smaller rare earth ion inclusions result in a sharp decrease in the emission intensity exhibited by the materials of the present invention. The upper limit of 0.5 is obtained when all of the terbium in the potassium-terbium europium tungstate crystal has been replaced by europium, resulting in a potassium-europium tungstate crystal. As seen from curve 1, increasing amounts of rare earth ion inclusions above the minimum limit of 0.003 causes the emission intensity to pass through a maximum and then decrease until the plotted emission intensity for potassium-europium tungstate is attained.

Based on the preceding considerations, a preferred europium ion inclusion range is 0.008 to 0.4 gram atom per formula with an optimum range being 0.01 to 0.2 gram atom per formula.

To obtain curves 1 and 2 of FIG. 2, measurements were made on various materials of the present invention with a Gaertner high dispersion spectrometer adapted with an AMINCO photomultiplier using a 1P22 tube. Ten micron slit widths were employed at the entrance and exit to the spectrometer. The system was calibrated against a tungsten filament lamp, whose output was assumed to have a black-body dependence, to give relative values of brightness of the emitting surface in units of power per unit wavelength range. Emission was excited by illuminating a sample one inch long by one-half inch wide by one-quarter inch deep with a 3660 A. rich H4 spot lamp through a Corning 5874 filter. The measurements on the tungstate crystals of the instant invention were made at room temperature, and the measurements on the molybdate crystals of the instant invention were made at liquid nitrogen temperature. The intensities are relative to 100 for the 6150 A. peak of a comparable sample of $Na_{0.5}Eu_{0.5}WO_4$.

As evidenced by curve 1 of FIG. 2, the substitution of potassium for sodium in the $Na_{0.5}Eu_{0.5}WO_4$ structure results in composition having one-third the emission intensity of sodium-europium tungstate. However, the potassium-europium tungstate structure exhibits a line width of less than one-third that of sodium-europium tungstate. In sodium-europium tungstate the sodium and europium ions are radomly distributed in equivalent sites. The resulting random electrostatic field of the disordered structure causes line broadening. In potassium-europium tungstate the potassium and europium ions are located in nonequivalent sites, thereby resulting in an ordered structure having a uniform internal electrostatic field which permits narrow line width.

As further evidenced by curve 1 of this figure, terbium ion dilutions of the potassium-europium tungstate structure enhance the emission intensity of this structure. The peak emission intensity of the resulting structure is comparable in brightness to that of sodium-europium tungstate.

It has been determined that replacing terbium with other rare earth ions in the composition of the invention results in either a nonfluorescent or weakly fluorescent material. For example, the substitution of cerium for terbium results in a nonfluorescent material, while the substitution of dysprosium, erbium, holmium, thulium, and other rare earth ions results in only a weakly fluorescent material. It has further been determined that replacing terbium with other non-rare earth ions in the compositions of the invention results in a material exhibiting an emission intensity lower than the potassium-europium tugnstate end component. Illustrative of this is plotted curve 2 for potassium-yttrium-europium tugnstate which exhibits the highest emission intensity at potassium-europium tungstate.

The following tables set forth D spacings and emission intensities of the compositions of the invention calculated from X-ray diffraction patterns of the compositions. The X-ray diffraction patterns were taken with a Straumanis-type Norelco camera (114.6 mm. diameter) using chromium, potassium alpha radiation. Table I sets forth the calculated D spacing and emission intensity for the $K_{0.5}Tb_{0.45}Eu_{0.05}MoO_4$ composition. It has been determined that the other molybdate compositions of the invention with the exception of $K_{0.5}Eu_{0.5}MoO_4$ exhibit similar D spacings and emission intensities. Table II sets forth the calculated D spacing and emission intensities for the $K_{0.5}Eu_{0.5}MoO_4$ composition. Table III sets forth the calculated D spacing and emission intensities for the $K_{0.5}Tb_{0.4}Eu_{0.1}WO_4$ composition. It has been determined that the other tungstate compositions of the invention exhibit similar D spacings and emission intensities. In these tables, the emission intensities are defined as follows:

$TR$ = trace
$VVW$ = very, very weak
$VW$ = very weak
$W$ = weak
$M$ = medium
$S$ = strong

TABLE I

| Lines | Int. | D Spacings | Lines | Int. | D Spacings |
|---|---|---|---|---|---|
| 1 | MS | 9.04 | 16 | W | 1.69 |
| 2 | M | 3.89 | 17 | VW | 1.66 |
| 3 | VVVW | 3.50 | 18 | VVW | 1.58 |
| 4 | S | 3.10 | 19 | VW | 1.56 |
| 5 | M | 2.99 | 20 | VVW | 1.54 |
| 6 | M | 2.95 | 21 | VVVW | 1.51 |
| 7 | VW | 2.55 | 22 | VVW | 1.48 |
| 8 | VVW | 2.47 | 23 | VVW | 1.46 |
| 9 | VW | 2.41 | 24 | VVVW | 1.42 |
| 10 | VVW | 2.26 | 25 | VW | 1.34 |
| 11 | TR | 2.08 | 26 | VVW | 1.29 |
| 12 | MW | 1.94 | 27 | VW | 1.23 |
| 13 | VW | 1.81 | 28 | VVW | 1.22 |
| 14 | VVW | 1.78 | 29 | VVW | 1.19 |
| 15 | VW | 1.75 | 30 | VVVW | 1.17 |

TABLE II

| Lines | Int. | D Spacings | Lines | Int. | D Spacings |
|---|---|---|---|---|---|
| 1 | W | 11.503 | 38 | VVW | 1.584 |
| 2 | W | 10.832 | 39 | VVW | 1.572 |
| 3 | W | 10.446 | 40 | VVW | 1.563 |
| 4 | MS | 9.936 | 41 | TR | 1.515 |
| 5 | S | 3.258 | 42 | VVW | 1.496 |
| 6 | S | 3.201 | 43 | VVW | 1.483 |
| 7 | S | 3.155 | 44 | VW | 1.474 |
| 8 | M | 2.911 | 45 | VVW | 1.463 |
| 9 | MS | 2.781 | 46 | VVW | 1.458 |
| 10 | VW | 2.639 | 47 | VVVW | 1.433 |
| 11 | VVW | 2.594 | 48 | W | 1.396 |
| 12 | VW | 2.553 | 49 | VVVW | 1.366 |
| 13 | TR | 2.404 | 50 | VW | 1.339 |
| 14 | VVVW | 2.334 | 51 | W | 1.322 |
| 15 | VVW | 2.223 | 52 | VW | 1.315 |
| 16 | VVVW | 2.117 | 53 | VW | 1.297 |
| 17 | MW | 2.050 | 54 | VW | 1.289 |
| 18 | W | 1.983 | 55 | W | 1.284 |
| 19 | VW | 1.965 | 56 | MW | 1.278 |
| 20 | VW | 1.952 | 57 | W | 1.269 |
| 21 | W | 1.936 | 58 | VVW | 1.256 |
| 22 | TR | 1.916 | 59 | W | 1.245 |
| 23 | W | 1.902 | 60 | VVW | 1.238 |
| 24 | VW | 1.890 | 61 | TR | 1.232 |
| 25 | TR | 1.792 | 62 | W | 1.227 |
| 26 | VW | 1.761 | 63 | VW | 1.221 |
| 27 | VW | 1.746 | 64 | VVW | 1.215 |
| 28 | M | 1.721 | 65 | VVW | 1.212 |
| 29 | MW | 1.705 | 66 | VVW | 1.205 |
| 30 | W | 1.686 | 67 | VW | 1.1921 |
| 31 | W | 1.674 | 68 | W | 1.1898 |
| 32 | W | 1.659 | 69 | W | 1.1805 |
| 33 | VW | 1.635 | 70 | VW | 1.1716 |
| 34 | VVVW | 1.631 | 71 | VW | 1.1666 |
| 35 | VW | 1.616 | 72 | VW | 1.1602 |
| 36 | W | 1.608 | 73 | W | 1.1531 |
| 37 | VVW | 1.593 | | | |

TABLE III

| Lines | Int. | D Spacings | Lines | Int. | D Spacings |
|---|---|---|---|---|---|
| 1 | VW | 6.294 | 36 | M | 1.595 |
| 2 | W | 6.025 | 37 | W | 1.577 |
| 3 | W | 5.154 | 38 | W | 1.529 |
| 4 | VVW | 3.998 | 39 | W | 1.511 |
| 5 | VW | 3.751 | 40 | MW | 1.486 |
| 6 | VVW | 3.258 | 41 | MW | 1.477 |
| 7 | S | 3.176 | 42 | M | 1.463 |
| 8 | M | 3.151 | 43 | W | 1.436 |
| 9 | MS | 3.046 | 44 | W | 1.432 |
| 10 | M | 2.859 | 45 | VVW | 1.400 |
| 11 | VW | 2.646 | 46 | VW | 1.392 |
| 12 | MMW | 2.597 | 47 | VVW | 1.372 |
| 13 | VVW | 2.506 | 48 | VVW | 1.367 |
| 14 | VVVW | 2.468 | 49 | VW | 1.346 |
| 15 | VVVW | 2.436 | 50 | W | 1.289 |
| 16 | VVW | 2.394 | 51 | VW | 1.263 |
| 17 | VVW | 2.233 | 52 | W | 1.258 |
| 18 | VVVW | 2.188 | 53 | VVW | 1.250 |
| 19 | VVW | 2.161 | 54 | VW | 1.246 |
| 20 | VVW | 2.140 | 55 | W | 1.238 |
| 21 | W | 2.121 | 56 | MW | 1.233 |
| 22 | W | 2.070 | 57 | W | 1.222 |
| 23 | VW | 2.036 | 58 | MW | 1.218 |
| 24 | VW | 2.015 | 59 | W | 1.214 |
| 25 | MW | 1.926 | 60 | W | 1.205 |
| 26 | W | 1.901 | 61 | VW | 1.199 |
| 27 | VW | 1.885 | 62 | VW | 1.197 |
| 28 | VW | 1.857 | 63 | W | 1.188 |
| 29 | M | 1.806 | 64 | VW | 1.186 |
| 30 | MW | 1.780 | 65 | MW | 1.184 |
| 31 | MW | 1.762 | 66 | VW | 1.164 |
| 32 | MW | 1.734 | 67 | W | 1.160 |
| 33 | MW | 1.670 | 68 | M | 1.150 |
| 34 | MW | 1.646 | 69 | W | 1.149 |
| 35 | MW | 1.605 | | | |

The tungstate crystals of the instant invention are advantageously grown by the ditungstate flux method disclosed in Patent 3,003,112, issued October 3, 1961 to L. G. Van Uitert. Briefly, in accordance with this method, a mixture of the desired tungstate and a europium containing composition is heated in suitable alkali metal ditungstate flux to a temperature sufficient to form a molten solution. The flux, which is a solvent for the tungstate and the europium containing composition, may contain an excess of tungstic anhydride in a molar amount up to the amount of the tungstate present in the initial mixture to enhance the solubility of these components. The molen solution is then slowly cooled until it solidifies. In the course of cooling, crystals of the tungstate containing europium ions are formed in the flux.

A comparable procedure is employed to grow the molybdate crystals of the invention by means of a dimolybdate flux optionally containing an excess of molybdic anhydride.

The initial mixture is equivalent to 10 mol parts to 75 mol parts of the tungstate or molybdate and 90 mol parts to 25 mol parts of the flux. One advantage of the flux is its solvent power, which permits temperatures of 900° C. to 1450° C. for the ditungstate flux and 900° C. to 1250° C. for the dimolybdate flux to be used in forming a molten solution of the mixture. These temperatures avoid reduction of the europium ions to lower undesirable valency states which are not suitable for optical maser use. Additionally, loss of tungstic or molybdic anhydride is not appreciable at these temperatures.

There is no critical limitation to particle size of the initial ingredients since a molten solution is formed of the initial mixture. However, it is desirable to minimize the amount of accidentally added rare earth ion impurity in order to insure consistent results. For example, the presence of a fraction of a percent of cerium is sufficient to quench the fluorescence of other rare earth ions in the tungstates or molybdates. With the exception of cerium, however, accidentally added rare earth ion impurities are generally tolerated in the compositions of the invention in amounts up to 1.0 percent of the principal active rare earth ion intentionally added. To minimize such contamination, spectroscopically pure rare earth substances, such as oxides, are typically utilized in the initial mixture. Generally, the non-active ion impurity limits are not critical and ordinary reagent grade tungstates or molybdates or substances that react to form the tungstates or molybdates are utilized.

The atmosphere in which the initial mixture is heated is not critical. However, it is well known to use an oxygen-containing atmosphere such as air, oxygen or oxygen plus an inert gas to prevent an ion in a higher valency state such as europium, which is unstable at elevated temperatures, from being reduced to a lower valency state. Similarly, for convenience, atmospheric pressure is normally used, although pressure is not critical. As is well known, increased pressures in general enhance solubility of the solute, thereby permitting lower temperatures to be used.

After the heating step the molten solution is cooled at a controlled rate of 0.1° C. per hour to 25° C. per hour in the same atmosphere used in the heating step until it solidifies, forming tungstate or molybdate crystals having fluorescent europium ions dispersed therein. The solidification point is readily determined visually. For most of the molten solutions, cooling to a temperature of 650 to 850° C. is adequate to cause solidification.

The tungstate or molybdate crystals in the flux are then furnace-cooled or quenched to room temperature. The ditungstate flux is removed from the tungstate crystals by washing the crystals with an alkali such as a solution of sodium hydroxide. The dimolybdate flux is removed from the molybdate crystals by washing the crystals with water.

Specific examples of procedures utilized in the preparation of compositions of the invention are given below. In all cases the properties of the resulting compositions were measured as previously described and the measurements plotted in accordance with the description in conjunction with FIG. 2. These examples are to be construed as illustrative only and not as limiting in any way the scope and spirit of the invention.

Example 1

75.5 grams $K_2CO_3$, 276.2 grams $WO_3$, 15.4 grams $Tb_2O_3$, and 3.7 grams $Eu_2O_3$ were dry mixed together. The mixture was then heated in a platinum crucible in air for 16 hours at a temperature of 1120° C. The molten solution formed was then cooled in air at a controlled rate of 2.5° C. per hour to a temperature of 700° C. The resulting solids were then furnace cooled to room temperature and washed with hot sodium hydroxide, leaving potassium-terbium tungstate crystals doped with trivalent europium. The formed crystals had the following composition:

$$K_{.5}Tb_{.4}Eu_{.1}WO_4$$

Example 2

75.5 grams $K_2CO_3$, 276.2 grams $WO_3$, 18.48 grams $Tb_2O_3$, and 0.74 gram $Eu_2O_3$ were dry mixed. The mixture then underwent the same processing as detailed above, with the resulting formation of potassium-terbium tungstate crystals doped with trivalent europium. The formed crystals had the following composition:

$$K_{.5}Tb_{.48}Eu_{.02}WO_4$$

Example 3

25.88 grams $K_2CO_3$, 104.25 grams $WO_3$, and 13.2 grams $Eu_2O_3$ were dry mixed. The mixture then underwent the same processing as detailed above, with the resulting formation of potassium tungstate crystals doped with trivalent europium. The formed crystals had the following composition:

$$K_{0.5}Eu_{0.5}WO_4$$

Example 4

53.53 grams $K_2CO_3$, 122.25 grams $MoO_3$, 1.32 grams $Eu_2O_3$ and 12.4 grams $TbO_3$ were dry mixed. The mixture then underwent the same processing as detailed above with the exception that the formed crystals were washed with water leaving potassium-terbium molybdate crystals doped with trivalent europium. The formed crystals had the following composition:

$$K_{0.5}Tb_{0.45}Eu_{0.05}MoO_4$$

Example 5

53.53 grams $K_2CO_3$, 122.25 grams $MoO_3$, 10.56 grams $Eu_2O_3$ and 2.75 grams $Tb_2O_3$ were dry mixed. The mixture then underwent the same processing as detailed above with the resulting formation of potassium-terbium molybdate crystals doped with trivalent europium. The formed crystals had the following composition:

$$K_{0.5}Tb_{0.1}Eu_{0.4}MoO_4$$

What is claimed is:

1. A composition of matter having the empirical formula $K_{0.5}Tb_{0.5-x}Eu_xA$ where A is selected from the group consisting of $WO_4$ and $MoO_4$ and $x$ has a value of from 0.003 to 0.50.
2. A composition of matter in accordance with claim 1 wherein $x$ has a value of from 0.008 to 0.4.
3. A composition of matter in accordance with claim 1 wherein $x$ has a value of from 0.01 to 0.2.

References Cited by the Examiner

UNITED STATES PATENTS 2,929,922   3/60   Schawlow et al. _____ 88—61

OTHER REFERENCES

Kroger: "Some Aspects of the Luminescence of Solids," published by the Elsevier Publ. Co. Inc., New York, 1948, pages 291 and 297.

MAURICE A. BRINDISI, *Primary Examiner.*

JOSEPH R. LIBERMAN, *Examiner.*